US006925917B2

(12) United States Patent
Tilley et al.

(10) Patent No.: US 6,925,917 B2
(45) Date of Patent: Aug. 9, 2005

(54) TOOL PROVIDED WITH IRRIGATION FOR TRANSECTION OF A BAND, RING OR THE LIKE AND METHOD OF USE

(76) Inventors: Robert J. Tilley, 33841 NE. Haugen Rd., Newberg, OR (US) 97132; Frank C. Sawyer, 1206 Center St., Silverton, OR (US) 97381

(*) Notice: Subject to any disclaimer, the term of this patent is extended or adjusted under 35 U.S.C. 154(b) by 0 days.

(21) Appl. No.: 10/309,551

(22) Filed: Dec. 3, 2002

(65) Prior Publication Data

US 2004/0103540 A1 Jun. 3, 2004

(51) Int. Cl.$^7$ .................... B26D 7/08; A61B 17/14
(52) U.S. Cl. ................ 83/15; 30/12.3; 606/82
(58) Field of Search .................. 30/123.3; 606/82; 83/15

(56) References Cited

U.S. PATENT DOCUMENTS

| | | |
|---|---|---|
| 1,867,342 A | 7/1932 | Wieg |
| 1,942,766 A | 1/1934 | O'Banion |
| 2,344,262 A | 3/1944 | Odierna et al. |
| 2,367,432 A | 1/1945 | Reprogle |
| 3,126,889 A | 3/1964 | Blumenfeld |
| 4,135,299 A | 1/1979 | Moriarty |
| 4,864,730 A | 9/1989 | Weiss |
| 4,953,292 A | 9/1990 | Tobey |
| 4,976,034 A | 12/1990 | Whitman |
| 5,012,582 A | 5/1991 | Bristol et al. |
| 5,020,226 A | 6/1991 | Chabbert |
| 5,038,474 A | 8/1991 | Larsson et al. |
| D328,842 S | 8/1992 | Whitman |
| 5,365,625 A | 11/1994 | Han |

*Primary Examiner*—Charles Goodman
(74) *Attorney, Agent, or Firm*—Kolisch Hartwell, P.C.

(57) ABSTRACT

A method and tool provided with irrigation for transection of a band, ring or the like and method of use is disclosed which includes a power-driven drill operable for driving a rotatable shaft which rotates a circular cutting blade mounted on the shaft, and a head assembly mounted on the drill includes a port structure oriented for transferring irrigation fluid from a source onto the ring or band to provide cooling to the ring or band and cooling to the cutting blade during cutting action. The transfer of irrigation fluid also facilitates removal of metallic filings or debris caused by the cutting action and irrigating a traumatized area adjacent the ring or band. The port structure is dimensioned with a bore for receiving a tubular member connected to the source, which delivers fluid to the port structure, which has an axis aligned substantially parallel to a planar surface of the cutting blade.

8 Claims, 2 Drawing Sheets

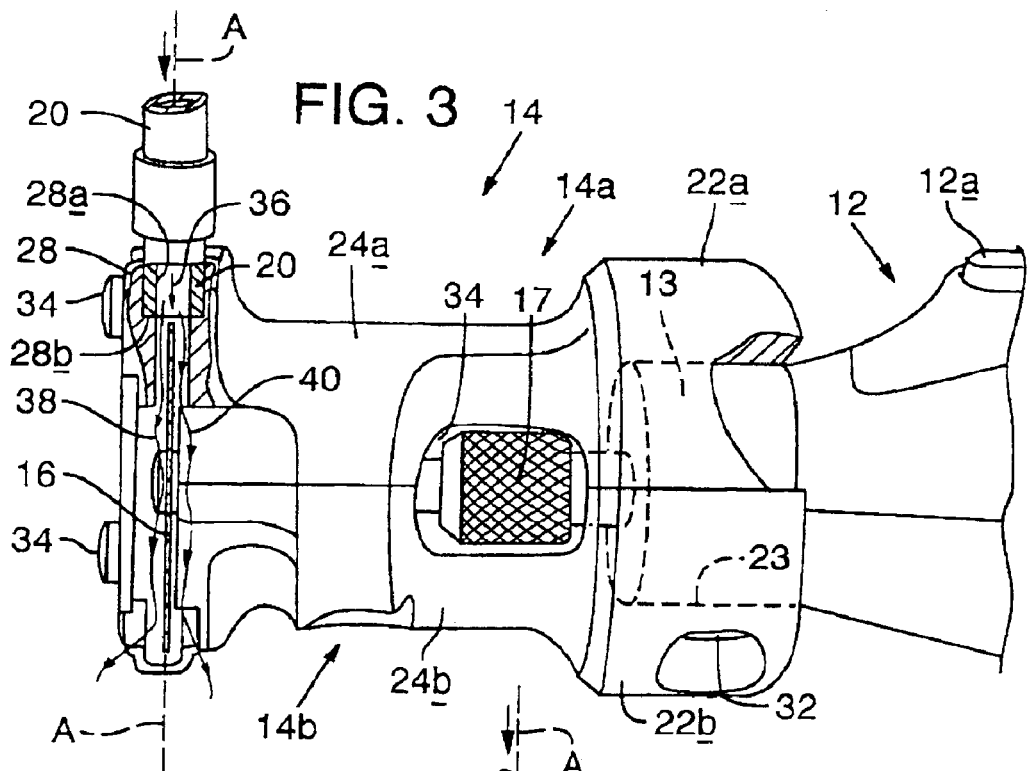
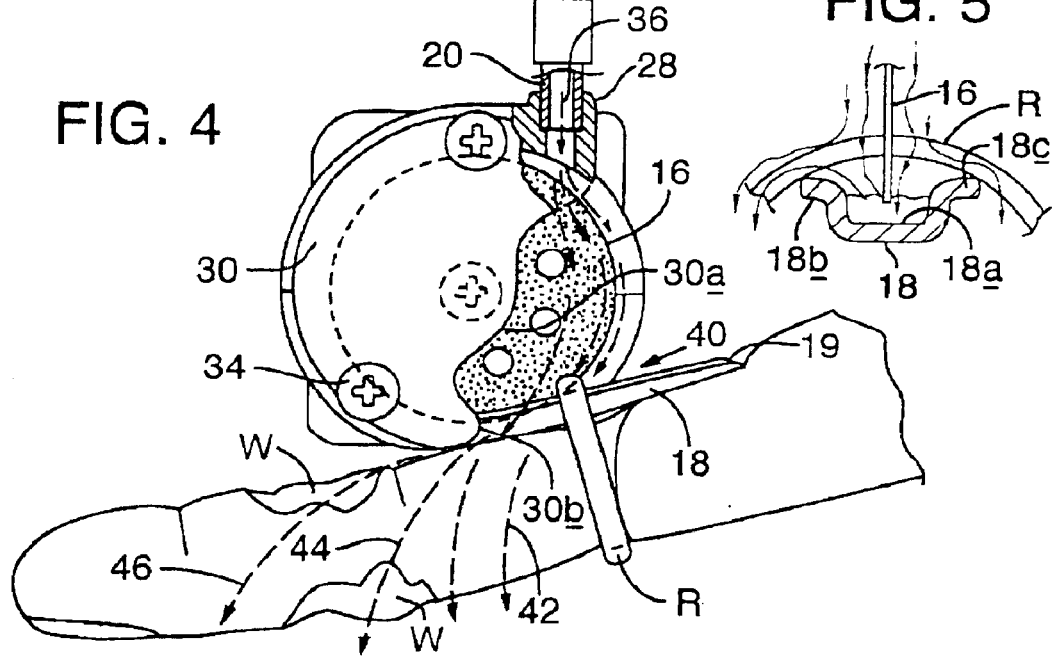

TOOL PROVIDED WITH IRRIGATION FOR TRANSECTION OF A BAND, RING OR THE LIKE AND METHOD OF USE

BACKGROUND OF THE INVENTION

The present invention relates to a tool having a cutting blade for transection of metallic objects encircling a portion of a person's anatomy, such as a finger ring, toe ring, band, bracelet, necklace or the like, and more particularly to a novel tool provided with irrigation for cooling the cutting blade and ring and dispersing filings or debris created during transection.

In clinics and in hospitals operating and emergency rooms, it is often necessary for medical personnel to remove a finger ring, or other encircling band such as a toe ring, bracelet, etc. from a patient's anatomy before the patient can be treated. In cases involving accidents, and in particular with those involving arms, hands and fingers, the fingers may become swollen, cut or injured in some manner that removal of a finger ring by pulling it off is impossible, but removal is necessary for further medical treatment. Numerous devices have been proposed for cutting away finger rings, which include power-driven cutting blades operable for transecting the ring so that it may then be distracted, or pulled apart, so that the finger or hand can be treated.

An example of a device for removing finger rings is set forth in U.S. Pat. No. 4,967,034 which includes a motor-driven, circular saw blade, positioned above a base element which is inserted between the ring and the finger to grasp the ring for cutting operation. The device includes two movable blades, so that the ring can be pried open by moving the blades away from each other. Another example of a power-driven ring cutter is set forth in U.S. Pat. No. 4,864,730 which includes a tool having a motor-driven circular saw blade and a lever arm, pivotally connected to the tool which includes an indented end for insertion between the finger ring and a patient's finger, to locate a rotating saw blade in position for cutting the finger ring.

Still another example of a device for removing finger rings is disclosed in U.S. Pat. No. 1,867,342 which incorporates a so-called saw wheel and ring support, which is inserted beneath the finger ring. The saw wheel is actuated by cutting tongs which can be squeezed together to bias the saw wheel against the ring, so that the saw wheel can be positioned by a handle, to effect cutting action. Another ring cutting and removing device is disclosed in U.S. Pat. No. 5,365,625 which is formed as a pliers-type cutting device with a built-in means for prying the ring apart, when cut, so that the ring can be removed from a finger.

In each of the devices described above, there is no specific provision for using any type of irrigation fluid, such as liquid or air, for cooling a cutting blade or device, or for dispersing metallic filings or debris from the ring as it is being cut, or for irrigating or washing a wound to keep it relatively free of metallic debris from the ring caused by cutting action.

There are other examples of saw blades and guides, for cutting away casts on patients, and these include U.S. Pat. Nos. 2,344,262, 1,942,766 and 5,020,226. In the latter of these patents, a cast cutter and method is disclosed in which a circular saw blade with teeth is operated by a manually operated crank arm; although the patent discloses that a power-driven motor could be used.

In U.S. Pat. No. 3,126,889, a surgical instrument is disclosed in which a motor rotates a cutter at high speed creating a blowing action in which it is claimed that heat incident to the cutting is dissipated, and surgical shock is claimed to be materially reduced. It is to be noted that this device is for surgery, as opposed to cutting away a metallic object, such as a finger ring, bracelet, toe ring, necklace, etc. The '889 patent also discloses tubular means for delivering an anesthetic agent to the site of incision, which includes an outlet discharging into a hood surrounding the cutting blade. The anesthetic is described as being picked up by the blowing action of the cutter and delivered to the incision site, and another conduit extends from the device's handle and has an outlet end for delivering medicating agents. A tube or conduit is also provided having a pick-up or inlet end adjacent the cutter below the bottom of the hood, which is connected to a vacuum pump, thereby to convey away blood from the incision site.

SUMMARY OF THE INVENTION

The present invention is directed to providing a novel method and tool for transecting a finger ring or the like, while simultaneously delivering irrigating fluid to the cutting blade and the finger ring to cool both and avoid excessive heat build-up and discomforture to a patient. The tool includes a novel head assembly which is connected to a power-driven drill, and the head assembly incorporates a shield or shroud covering a portion of the cutting blade along its side so that a physician or medical personnel operating the tool can observe and follow the blade's cutting action as it transects through the ring. Significantly, the head assembly includes a port structure mounted above the cutting blade for delivering irrigation fluid downwardly so that it sweeps over surfaces of the cutting blade, against the ring at the cutting site and over the finger to wash away debris and biological contaminants.

Another feature of the present invention is that the head assembly is comprised of a pair of sections, which may be assembled to clamp onto the neck of drill and extend outwardly to provide the aforementioned shield or shroud, and proper orientation of the port structure. The port is oriented to face upwardly to receive conventional tubing from an IV bottle, so that irrigating fluid flows through the port structure and onto the cutting blade, at locations along sides of the blade and its along portions of its cutting edges or teeth.

The head assembly may be readily detached and discarded, enabling inexpensive manufacture of the head assembly so that it does not have to be reused, if made of synthetic material such as plastic or the like. Sterilization of the head assembly between uses is thereby unnecessary.

The present invention provides rapid transection of a ring, while cooling and dispersal of metallic debris and waste is ensured, all provided by a readily attachable head assembly which also includes a guide element, connected adjacent the cutting blade, for insertion between the ring and the finger, so that the tool may be slided along the ring as the cutting or transecting action progresses.

BRIEF DESCRIPTION OF THE DRAWINGS

FIG. 3 is an enlarged view, taken from the side, showing the head assembly with portions cut away, to illustrate the port structure for receiving a tubular member for delivering irrigation fluid over the cutting blade;

FIG. 4 is an end view, showing the tool in operation, transecting a finger ring, and illustrates by flow lines the direction of irrigating fluid from the port over the cutting blade, the finger ring and portions of the finger; and FIG. 5 is a cross-sectional view showing the channel construction of the guide element and how the cutting blade extends into the channel to insure complete transection of a finger ring.

DETAILED DESCRIPTION OF THE PREFERRED EMBODIMENT AND BEST MODE OF CARRYING OUT THE INVENTION

The present invention, as mentioned at the outset, is directed to a novel method and tool for transecting an object such as a ring or band which encircles or substantially encircles a portion of a person's anatomy. The tool finds particular application in transection of a finger ring and is advantageously used in emergency room (ER) settings. The tool is portable, and can be used to quickly transect a finger ring so that it may be distracted (pulled apart) so that an injury to the hand or fingers may be treated. In ER settings, and medical personnel often must quickly remove a finger ring; in this connection, it is necessary to keep the ring cool because of the substantial heat generated during the cutting action at the cutting site. This is accomplished by provision of a novel port structure mounted on the tool for delivering irrigating fluid from a source to provide cooling to the cutting blade and also provide irrigating and facilitate washing of debris from the cutting action and blood or other biological contaminants from wounds or traumatized areas on the finger adjacent the cutting site.

Figure 1:
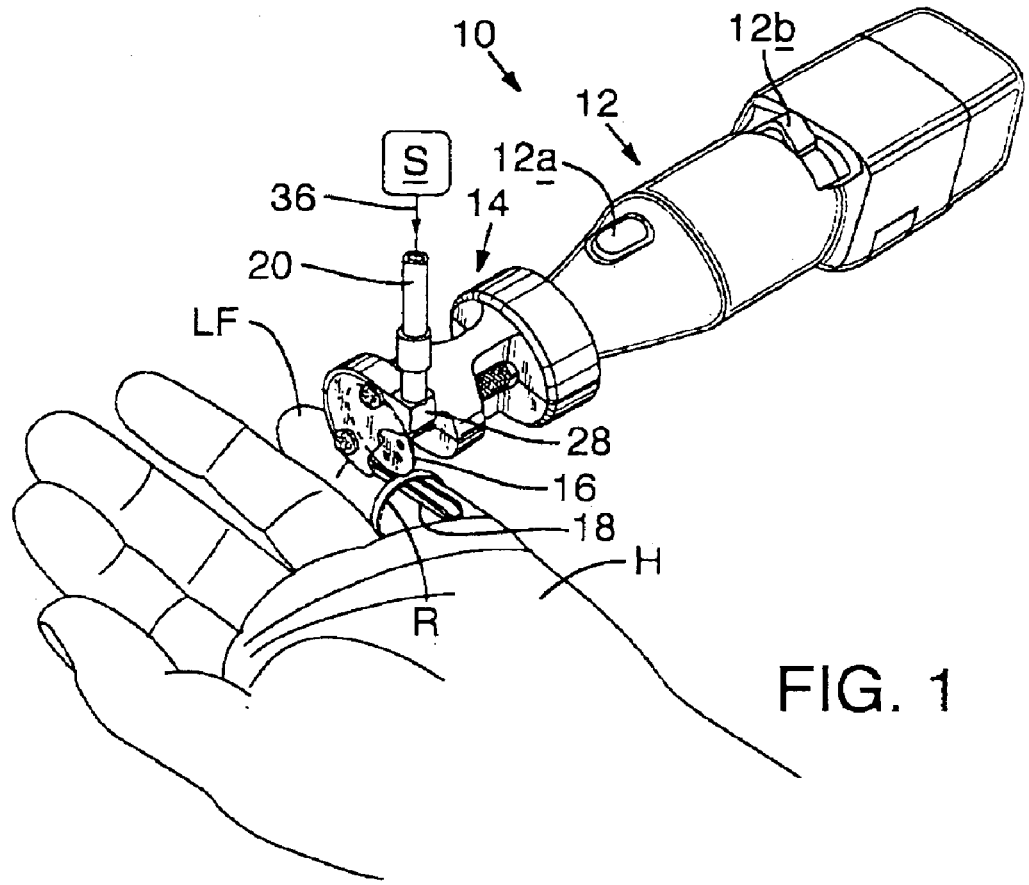
FIG. 1 is a perspective view, showing a person's left hand with the tool of the present invention being utilized to transect a ring from the left little finger.

A cutting tool in accordance with the present invention is shown in FIG. 1, and is shown during transection of a band, such as a finger ring from a person's little finger on the left hand. The tool, generally indicated at 10, includes a power driven drill generally indicated at 12 and a two-component housing or head assembly, generally indicated at 14 which is rigidly and detachably connected to the drill. The head assembly includes a guide element 18 which has been positioned relative to a person's hand H so that it extends between a person's little finger LF and a ring R to be transected. The head assembly is provided with a port structure, to be described hereinafter, which receives tubing generally indicated at 20 for receiving irrigating fluid from a source S so that the irrigating fluid or liquid may be directed over cutting blade 16, downwardly over ring R and any injured areas adjacent the cutting site.

The source may be a bottle of IV fluid or saline solution mounted on a pole which in turn may be mounted on a gurney or other suitable structure. The source S is only diagrammatically shown in FIG. 1. Drill 12 is provided with a forward or reverse switch 12a and a speed switch 12b. There are different types of power drills which are suitable for application in the present invention, and an example is one manufactured by Dremel, which provides two speeds at either 5,000 or 10,000 revolutions per minute, at 4.8 volts. A suitable interrupt switch is provided.

Figure 2:
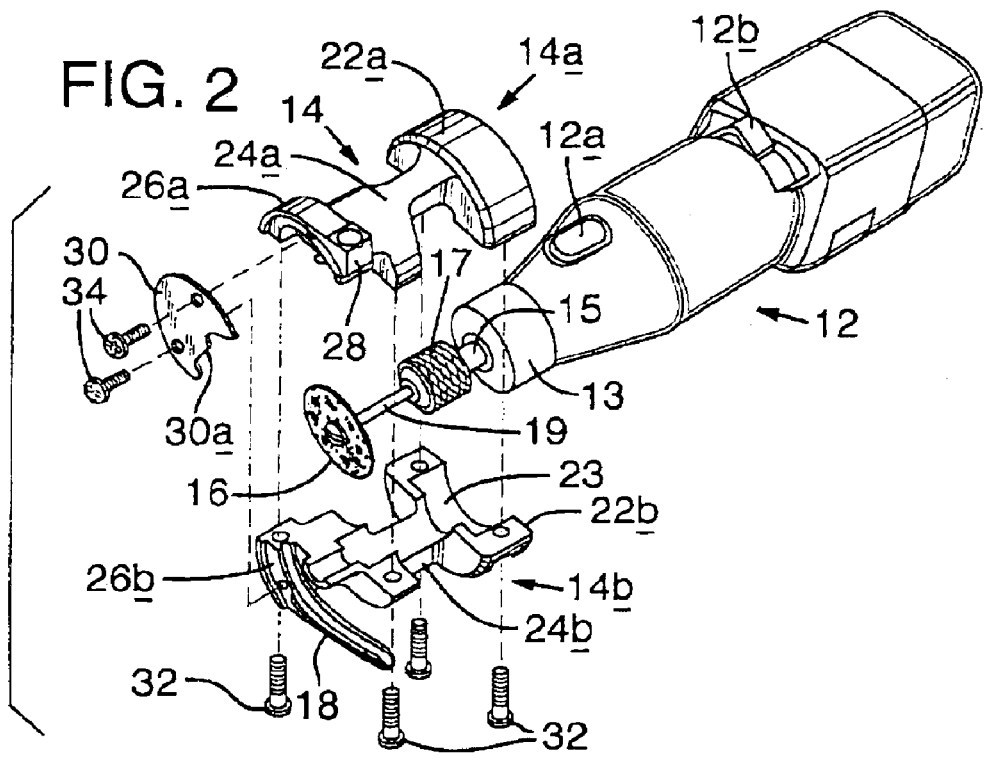
FIG. 2 is an exploded view, of the head assembly of the present invention, showing its orientation relative to a power drill, and how the various components are aligned for assembly.

As shown in the exploded view of FIG. 2, housing 14 includes a pair of detachable, mateable components or sections, such as first section 14a and second section 14b. First, section 14a is provided with a semicylindrical, enlarged first end 22a, a connecting arm 24a and a rim section 26a which includes a port fitting or structure indicated at 28. Shown beneath first section 14a is second section 14b which includes a semi-cylindrical, enlarged second or distal end 22a, a connecting arm 24b and a rim section 26b, which transitions into guide element 18.

It will be noted in FIG. 2 that distal end 22b includes a curved section 23 (a like curved section is provided on first end 22a, not seen) for mounting against neck 13 of drill 12 when secured to the drill as shown in FIG. 3. As shown in FIG. 2, a shield plate 30 is suitably dimensioned for mounting against rims 26a and 26b, when head assembly 14 is assembled, for shielding cutting blade 16, at least partially. The shield plate is not a continuous disc, but is provided with an irregular edge 30a to expose a portion of the cutting blade and its teeth, so that a physician can see the operation of the cutting blade, as will be described. As also shown in FIG. 2, drill 12 includes a rotatable shaft 15, a chuck 17 and a spindle 19 to which cutting blade 16 is suitably mounted. As shown, threaded fasteners as shown at 32 are used to secure first and second sections 14a and 14b, respectively, together, through aligned and threaded bores provided in the sections. Similarly, threaded fasteners 34 mount shield plate 30 to rim sections 26a and 26b.

An enlarged view of the head assembly mounted on neck 13 is shown in FIG. 3. The threaded fasteners used to detachably secure the first and second sections are fully engaged. An opening is shown at 34 to expose chuck 17 for loosening/tightening as deemed necessary.

A significant feature of the construction of head assembly 14 is provision of a port structure such as shown at 28 in FIGS. 2 and 3. Port structure 28 may take the form of an upward extension from rim section 26a and is provided with a bore 28a. The bore extends into port fitting 28 and defines a bottom ledge 28b to which a bottom of tube 20 may abut against or seat, as shown in FIG. 3. As also shown in FIG. 3, bore 28a is dimensioned to include a central axis A, which is oriented to align substantially parallel to a planar surface of cutting blade 16, as shown. Axis A can be aligned to one side or the other of blade 16, from the position shown in FIG. 3, but the important point is that axis A is to be oriented so that irrigation fluid is directed over the blade so that it sweeps over areas on both sides of the blade. Preferably, axis A cuts right through the central plane of the cutting blade, as shown.

As shown in FIG. 3, irrigation fluid, generally indicated by the downwardly directed arrow at 36, sweeps downwardly from above and over the blade or portions thereof, such as shown at 38 and 40. That fluid flow is also shown in FIGS. 4 and 5, and is directed to wash away filings and debris from the cutting action and also facilitate cleaning or washing away of blood or other contaminants, biological or otherwise adjacent a wound or traumatized area, such as indicated at W. Of course, the purpose of the irrigation fluid is also to facilitate cooling of the cutting blade and ring.

As shown in FIG. 4, guide element 18 has been inserted between a finger and a ring R, and the drill has been energized to rotate cutting blade 16 in a clockwise direction so that cutting blade 16 is operable for transecting ring R at a cutting zone or site generally indicated at 40. Irrigation flow directed along line or path 36, adjacent an upper portion of cutting blade 16, sweeps over both sides of the cutting blade and downwardly against ring R for washing away debris and contaminants generally along the flow paths diagrammatically shown at 42–46, etc. It will also be noted from a consideration of FIG. 5 that guide element 18 is provided with a channeled portion 18a defined by opposed, elongate ridges or sides 18b, 18c, and a beveled end 19. The bevel provides ease of inserting the guide element beneath the ring. The channel serves to receive cutting blade 16 so that it is insured that the blade will transect or cut through ring R.

OPERATIONAL SEQUENCE

The transection tool of the present invention, which incorporates the detachable head assembly, will now be described in use, assuming that an injured person needs to have a finger ring removed rapidly, facilitated by substantially continuous action of the cutting blade, which is enabled by the cooling action of the irrigation fluid, as described above. Initially, it will be presumed that a patient with trauma on the hand or fingers is transferred from a site where injury occurs to a suitable medical facility, such as a hospital, clinic or emergency room. The patient may be inclined on a gurney and the hand suitably draped or otherwise prepared by an attendant for removal of the finger ring. It will be assumed that the head assembly is secured in operative position and the physician, orients the patient's hand, for example as shown in FIG. 1, to slip or insert guide element 18 beneath the finger ring and between the finger. The cutting blade has not been actuated, and at this point, port 28 structure is suitably connected via a tube 20 to an IV fluid source. A clamp may be provided on the tube for restricting or permitting irrigation flow when needed. With the cutting blade now in operative position, the physician may actuate the drill to provide cutting action. At this time, the flow of IV or irrigation fluid is open so that it flows, as shown in FIGS. 3 and 4, over the cutting blade and at the cutting site, to provide heat transfer from the transecting action between the cutting blade and ring to the fluid, thereby keeping heat build-up to a minimum so that uncomfortable heat is not transferred from the blade/ring and thereby to the patient's finger. The physician moves the tool in a direction to increase cutting action until the ring is transected at the cutting site; during this period, continuous irrigation flow is maintained and washing away of metal filings and debris from the cutting site is achieved, washing action also sweeping over wound or traumatized areas. Once transection is completed, the cutting blade is pulled away and irrigation fluid may be cut off. The ring is then distracted, or pulled apart, so that the wound or other areas are exposed for treatment.

While the use of an irrigating fluid, such as an IV fluid has been described, it should be understood that other directed flow, such as air jets or other fluids or liquids could be used to accommodate cooling and dispersal of filings and debris as described above. The positioning of port structure 28, to orient the direction of fluid flow enables the fluid, whether liquid or air, to be directed on a cutting blade so that the fluid sweeps over sides of the cutting blade to effect cooling and dispersal of metallic debris from the cutting site. As shown in FIGS. 3 and 4, port fitting 28 is positioned above the cutting blades' central, horizontal diameter, as shown in these views. In addition, the port structure is positioned so that fluid is initially directed against portions of the cutting blade prior to sweeping over the cutting site and the ring, insuring that a mass of cooling fluid cools the blade over a leading edge portion of the blade, and not just at the cutting site.

As shown in FIG. 4, shield plate 30 is provided with an irregular edge 30a, so that a portion of the cutting blade is exposed to view, facilitating the physician's knowledge of a degree of cutting action or transection. The irregular surface, as illustrated, exposes at least a third of the exterior planar surface of the cutting blade, as shown. A rounded edge or lobe 30b is provided so that as the tool is advanced forwardly during cutting action, a smooth surface, if any, will engage the patient's finger. It will also be noted that guide element 18 includes a beveled front or leading edge 19 for facilitating insertion between the ring and finger.

An advantageous feature of the present invention is the detachable, two-part head assembly shown and described. The head assembly may be quickly attached/detached, enabling a drill to be repetitively used, and a head assembly, which may become contaminated, to either be disinfected, or depending upon materials, discarded. For example, it is contemplated that the head assembly may be fabricated from suitable ABS plastic, and so cost will be relatively low.

We claim:

1. A power-driven tool operable for transecting a ring or band from encircling a portion of a person's anatomy comprising:

a power-driven drill operable for driving a rotatable shaft;

a circular cutting blade mounted on the shaft for rotation therewith; and a head assembly mounted on the drill including a port structure oriented for transferring irrigation fluid from a source onto the ring or band to provide cooling to the ring or band and cooling to the cutting blade during cutting action and for facilitating removal of metallic debris caused by the cutting action and irrigating a traumatized area adjacent the ring or band;

wherein the port structure is oriented above at least a portion of the cutting blade for directing fluid over the cutting edge of the cutting blade and downwardly onto and over the ring or band at the cutting site.

2. The tool of claim 1 wherein the port structure is dimensioned with a bore for releasably receiving a tubular member which in turn delivers fluid to the port structure, the port structure having an axis aligned substantially parallel to a planar surface of the cutting blade.

3. The tool of claim 2 wherein the port structure includes a bore having an axis substantially aligned with a planar surface of the cutting blade.

4. The tool of claim 1 wherein the head assembly is configured for detachable mounting on the power-driven drill.

5. The tool of claim 1 wherein the head assembly includes a first section configured for detachable mounting on the drill, and a second section provided with a shield which is mounted substantially parallel to the plane of the cutting blade, for covering a portion of the cutting blade while exposing another portion of the cutting blade and associated cutting edges for viewing during transection of a ring or band.

6. A power-driven tool operable for transecting a ring or band from encircling a portion of a person's anatomy comprising:

a power-driven drill operable for driving a rotatable shaft;
a circular cutting blade mounted on the shaft for rotation therewith;
a head assembly including first and second sections configured for detachable mounting on the drill, the first section including a port structure oriented above at least a portion of the cutting blade for transferring and directing irrigation fluid from a source over the cutting edge of the cutting blade and downwardly onto and over the ring or band at the cutting site to provide cooling to the cutting blade and the ring or band during cutting action for facilitating removal of metallic debris caused by the cutting action and irrigating a traumatized area adjacent the ring or band.

7. A method for transecting a band or a ring, such as a finger ring encircling at least a portion of a person's finger comprising:

provividing a power-driven drill operable for driving a rotatable shaft which in turn is operable for rotating a circular cutting blade, the drill having a port positioned adjacent the cutting blade;

inserting a guide element provided on the drill beneath the band to be transected;

advancing the cutting blade against the ring for transecting the ring; and delivering fluid from a source through the port structure onto the cutting blade and the band for cooling the cutting blade during cutting action and for facilitating removal of metallic debris caused by the cutting action and irrigating a traumatized area adjacent the ring or band.

8. The method of claim 7 wherein the delivery fluid step includes directing the fluid over portions of the planar surface of the cutting blade, and its cutting edge, and downwardly onto and over the ring or bend at the cutting site.

* * * * *